United States Patent
Morita

(10) Patent No.: US 8,144,172 B2
(45) Date of Patent: Mar. 27, 2012

(54) COLOR TEMPERATURE CORRECTION DEVICE AND DISPLAY DEVICE

(75) Inventor: Tomoko Morita, Osaka (JP)

(73) Assignee: Panasonic Corporation, Osaka (JP)

( * ) Notice: Subject to any disclaimer, the term of this patent is extended or adjusted under 35 U.S.C. 154(b) by 682 days.

(21) Appl. No.: 12/301,677

(22) PCT Filed: May 22, 2007

(86) PCT No.: PCT/JP2007/060437
§ 371 (c)(1),
(2), (4) Date: Nov. 20, 2008

(87) PCT Pub. No.: WO2007/136060
PCT Pub. Date: Nov. 29, 2007

(65) Prior Publication Data
US 2009/0267967 A1  Oct. 29, 2009

(30) Foreign Application Priority Data
May 24, 2006  (JP) ................ 2006-143473

(51) Int. Cl.
G09G 5/10 (2006.01)
G09G 3/28 (2006.01)
G01J 1/44 (2006.01)
G01D 5/34 (2006.01)
H05B 37/02 (2006.01)
H05B 39/04 (2006.01)
H05B 41/36 (2006.01)
G06F 15/16 (2006.01)

(52) U.S. Cl. ......... 345/690; 345/60; 345/63; 250/214 B; 250/231.1; 315/149; 709/219

(58) Field of Classification Search .......... 345/63, 345/211, 204, 589, 690, 100, 60, 77, 613, 345/87–89, 102, 208, 593; 348/674; 353/85; 428/411.1; 250/363.03, 214 B, 231.1; 358/1.9; 709/219; 356/5.09; 396/105
See application file for complete search history.

(56) References Cited

U.S. PATENT DOCUMENTS
4,218,614 A * 8/1980 Miller .................. 250/231.1
(Continued)

FOREIGN PATENT DOCUMENTS
CN  1549233  11/2004
(Continued)

OTHER PUBLICATIONS
International Search Report issued Aug. 27, 2007, in the International (PCT) Application No. PCT/JP2007/060437.
(Continued)

*Primary Examiner* — Quan-Zhen Wang
*Assistant Examiner* — Lin Li
(74) *Attorney, Agent, or Firm* — Wenderoth Lind & Ponack, L.L.P.

(57) ABSTRACT

A color temperature correction device corrects, in a display device that represents brightness of RGB of a video signal by a plurality of levels of gray scales, a color temperature of the video signal. The color temperature correction device includes: a recording means of storing a gray scale value conversion table for an input gray scale value of a video signal to set gray scale values for respective RGB, so that a consistent color temperature is maintained; and a gray scale value converting unit that converts the input gray scale value to set gray scale values, based on the gray scale value conversion table.

6 Claims, 21 Drawing Sheets

U.S. PATENT DOCUMENTS

| | | | |
|---|---|---|---|
| 5,099,113 A * | 3/1992 | Oi et al. | 250/214 B |
| 6,331,843 B1 | 12/2001 | Kasahara et al. | |
| 6,414,658 B1 * | 7/2002 | Tokunaga | 345/63 |
| 6,495,964 B1 * | 12/2002 | Muthu et al. | 315/149 |
| 2002/0014848 A1 * | 2/2002 | Tokunaga | 315/169.1 |
| 2005/0024354 A1 | 2/2005 | Hosoi et al. | |
| 2005/0078079 A1 * | 4/2005 | Hashimoto | 345/100 |
| 2005/0102376 A1 * | 5/2005 | Ichikawa | 709/219 |
| 2005/0110812 A1 * | 5/2005 | Park et al. | 345/693 |
| 2005/0232508 A1 * | 10/2005 | Lee | 382/264 |
| 2006/0038748 A1 * | 2/2006 | Chiu et al. | 345/60 |
| 2006/0050245 A1 * | 3/2006 | Arai et al. | 353/85 |
| 2008/0068405 A1 | 3/2008 | Kumakura et al. | |

FOREIGN PATENT DOCUMENTS

| | | |
|---|---|---|
| CN | 1652196 | 8/2005 |
| EP | 1 164 562 | 12/2001 |
| JP | 2994630 | 10/1999 |
| JP | 2001-255843 | 9/2001 |
| JP | 2002-244615 | 8/2002 |
| JP | 2004-21166 | 1/2004 |
| JP | 2005-25058 | 1/2005 |

OTHER PUBLICATIONS

International Preliminary Report on Patentability issued Dec. 24, 2008 in the International (PCT) Application No. PCT/JP2007/060437.

Chinese Office Action issued Apr. 23, 2010 in Application No. 200780017072.5.

* cited by examiner

COLOR TEMPERATURE CORRECTION DEVICE AND DISPLAY DEVICE

BACKGROUND OF THE INVENTION

1. Technical Field

The present invention relates to a color temperature correction device that performs color temperature correction of a display panel and a display device including the color temperature correction device.

2. Background Art

Plasma display panel devices using a plasma display panel (PDP) capable of reducing thickness and increasing size are widely known. The plasma display panel devices display an image by using light emission from discharge cells composing pixels. More specifically, a high-voltage drive pulse is applied, by a drive circuit, between electrodes composing a discharge cell to cause the discharge cell to emit light. An image is displayed by light emission of each pixel.

Here, when an image with high brightness is displayed, in a plasma display panel device, numbers of sustain pulses are applied to scanning electrodes and sustain electrodes by a scanning drive circuit and a sustain drive circuit and the number of charges and discharges of a PDP increases, and thus, the power consumption of the scanning drive circuit and the sustain drive circuit increases.

In regard to this, by reducing a weighing factor N (drive factor) of the number of sustain pulses included in a sustain period in a subfield, during which a sustain voltage is outputted, based on the power consumption of a plasma display panel, an increase in power consumption is suppressed, as described in Japanese Patent No. 2994630.

SUMMARY OF THE INVENTION

However, measured brightness values that are actually obtained for respective RGB of a video signal by an input gray scale value are different from their respective ideal brightness values that are targeted with the input gray scale value. As a result, there may be a case in which the color temperature that should be originally represented by the video signal becomes different.

Hence, an object of the present invention is to provide a color temperature correction device that corrects a change in color temperature caused by measured brightness values, which are actually obtained with respect to an input gray scale value of a video signal, shifting from their respective ideal brightness values, and a display device including the color temperature correction device.

A color temperature correction device according to the present invention is a device that corrects, in a display device that represents brightness of RGB of a video signal by a plurality of levels of gray scales, a color temperature of the video signal, the color temperature correction device including:

a recording unit operable to store a gray scale value conversion table for an input gray scale value of a video signal to set gray scale values for respective RGB, so that a consistent color temperature is maintained; and a gray scale value converting unit operable to convert the input gray scale value to set gray scale values, based on the gray scale value conversion table.

The gray scale value conversion table may include:

a first gray scale value conversion table showing a relationship of ideal brightness values for the respective RGB to the input gray scale value of the video signal to maintain a consistent color temperature; and a second gray scale value conversion table showing a relationship to set gray scale values at which the ideal brightness values are obtained.

The gray scale value conversion table may further include support from an input gray scale value to set gray scale values for each drive mode. In this case, the gray scale value converting unit can convert the input gray scale value to set gray scale values, based on the gray scale value conversion table and according to a selected drive mode.

A display device according to the present invention includes:

an inverse gamma correcting unit operable to perform inverse gamma correction on a gamma-corrected video signal;

the above-mentioned color temperature correcting device that corrects a color temperature of the inverse-gamma-corrected video signal;

an average brightness detecting unit operable to detect average brightness of the color-temperature-corrected video signal;

a drive mode selecting unit operable to select a drive mode based on the detected average brightness and outputting a multiplication coefficient;

a multiplier that multiplies set gray scale values of the color-temperature-corrected video signal by the outputted multiplication coefficient to output set gray scale values in which a brightness difference caused by the drive mode is corrected;

a subfield converting unit operable to set a subfield condition based on the set gray scale values and the set drive mode;

a display panel;

a scanning/sustain/erase drive circuit that performs control of scanning, sustaining, and erasing of the display panel, based on the set subfield condition; and a data drive circuit of the display panel.

A display device according to the present invention includes:

an inverse gamma correcting unit operable to perform inverse gamma correction on a gamma-corrected video signal;

an average brightness detecting unit operable to detect average brightness of the inverse-gamma-corrected video signal;

a drive mode selecting unit operable to select a drive mode based on the detected average brightness and outputting a multiplication coefficient;

the above-mentioned color temperature correcting device that corrects a color temperature of the video signal based on the selected drive mode;

a multiplier that multiplies set gray scale values of the color-temperature-corrected video signal by the outputted multiplication coefficient to output set gray scale values in which a brightness difference caused by the drive mode is corrected;

a subfield converting unit operable to set a subfield condition based on the set gray scale values and the set drive mode;

a display panel;

a scanning/sustain/erase drive circuit that performs control of scanning, sustaining, and erasing of the display panel, based on the set subfield condition; and a data drive circuit of the display panel.

Color temperature correcting unit according to the present invention is a device that corrects, in a display device that represents brightness of RGB of a video signal by a plurality of levels of gray scales, a color temperature of the video signal, the color temperature correction device including:

a multiplier that multiplies an input gray scale value of a video signal by a drive factor of a selected drive mode and outputs an input number of light emission pulses;

a storage unit operable to store a number-of-light-emission-pulses conversion table for the input number of light emission pulses to set numbers of light emission pulses for respective RGB that creates white, so that a consistent color temperature is maintained;

a number-of-light-emission-pulses converting unit operable to convert the input number of light emission pulses of the video signal to set numbers of light emission pulses for the respective RGB, based on the number-of-light-emission-pulses conversion table; and a divider that divides the set numbers of light emission pulses by the drive factor and outputs set gray scale values.

The number-of-light-emission-pulses conversion table may include:

a first number-of-light-emission-pulses conversion table showing a relationship of ideal brightness values for the respective RGB that creates white to the input number of light emission pulses of the video signal to maintain a consistent color temperature; and a second number-of-light-emission-pulses conversion table showing a relationship to set numbers of light emission pulses at which the ideal brightness values are obtained.

A display device according to the present invention includes:

an inverse gamma correcting unit operable to perform inverse gamma correction on a gamma-corrected video signal;

an average brightness detecting unit operable to detect average brightness of the inverse-gamma-corrected video signal;

a drive mode selecting unit operable to select a drive mode based on the detected average brightness and outputting a multiplication coefficient;

a multiplier that multiplies an input gray scale value of the video signal by the outputted multiplication coefficient to output an input gray scale value in which a brightness difference caused by the drive mode is corrected;

the above-mentioned color temperature correction device that calculates an input number of light emission pulses by multiplying the input gray scale value by a drive factor of the drive mode, performs color temperature correction by converting the input number of light emission pulses to set numbers of light emission pulses, so that a consistent color temperature is maintained, and divides the set numbers of light emission pulses by the drive factor and then outputs set gray scale values;

a subfield converting unit operable to set a subfield condition based on the set gray scale values and the set drive mode, a display panel;

a scanning/sustain/erase drive circuit that performs control of scanning, sustaining, and erasing of the display panel, based on the set subfield condition; and a data drive circuit of the display panel.

According to the color temperature correcting devices according to the present invention, color temperature correction of a video signal can be performed with respect to an input gray scale value, so that a consistent color temperature is maintained.

BRIEF DESCRIPTION OF THE DRAWINGS

The present invention will become readily understood from the following description of preferred embodiments thereof made with reference to the accompanying drawings, in which like parts are designated by like reference numeral and in which.

DETAILED DESCRIPTION OF THE INVENTION

Figure 1:
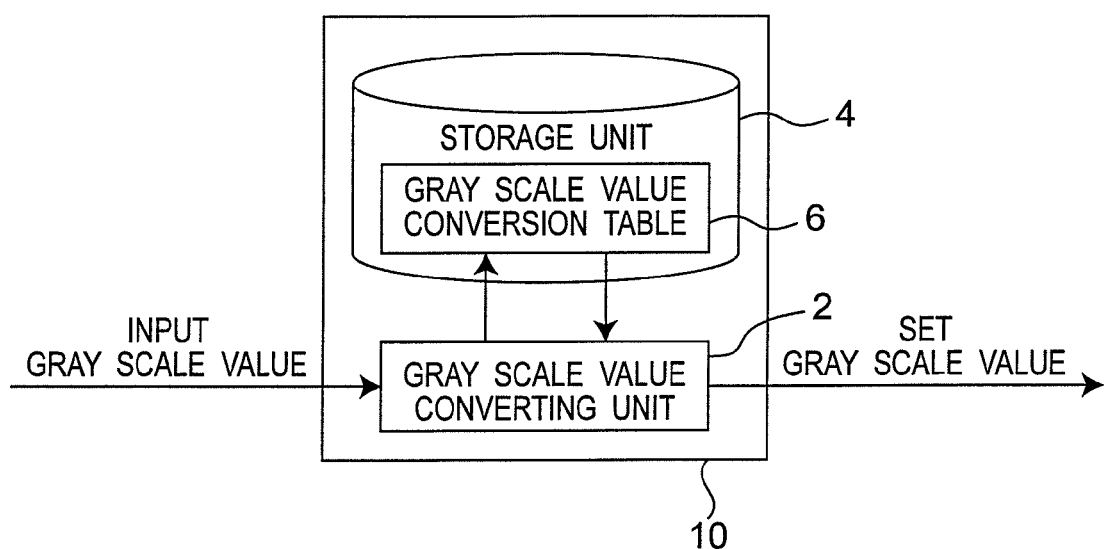
FIG. 1 is a block diagram showing a configuration of a color temperature correction device according to a first embodiment of the present invention.

A color temperature correction device and a plasma display device including the color temperature correction device, according to embodiments of the present invention will be described in detail using the accompanying drawings. Note that in the drawings substantially the same members are denoted by the same reference numerals.

First Embodiment

A color temperature correction device 10 according to a first embodiment of the present invention will be described using a block diagram of FIG. 1. The color temperature correction device 10 includes a storing unit 4 of storing a gray scale value conversion table 6 for an input gray scale value of a video signal to set gray scale values for respective RGB that creates white, so that a consistent color temperature is maintained; and a gray scale value converting unit 2 that converts an input gray scale value to set gray scale values, based on the above-described gray scale value conversion table 6. According to the color temperature correction device 10, by converting an input gray scale value to set gray scale values using the gray scale value conversion table 6 that is prepared in advance according to the characteristics of a display device, a consistent color temperature can be maintained.

Figure 2:
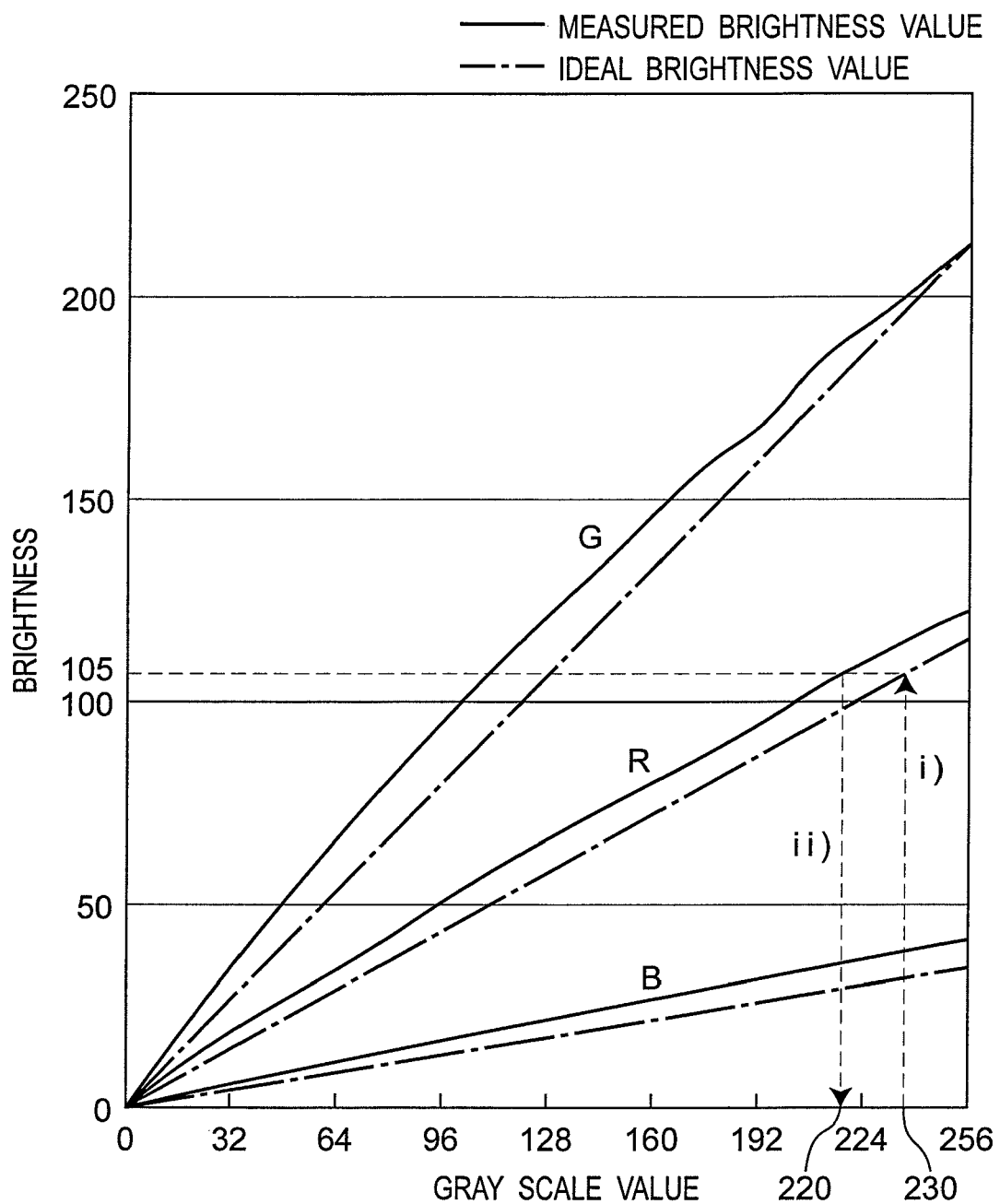
FIG. 2 is a schematic diagram describing a method for gray scale value conversion in a color temperature correction method according to the first embodiment of the present invention.
Figure 3:
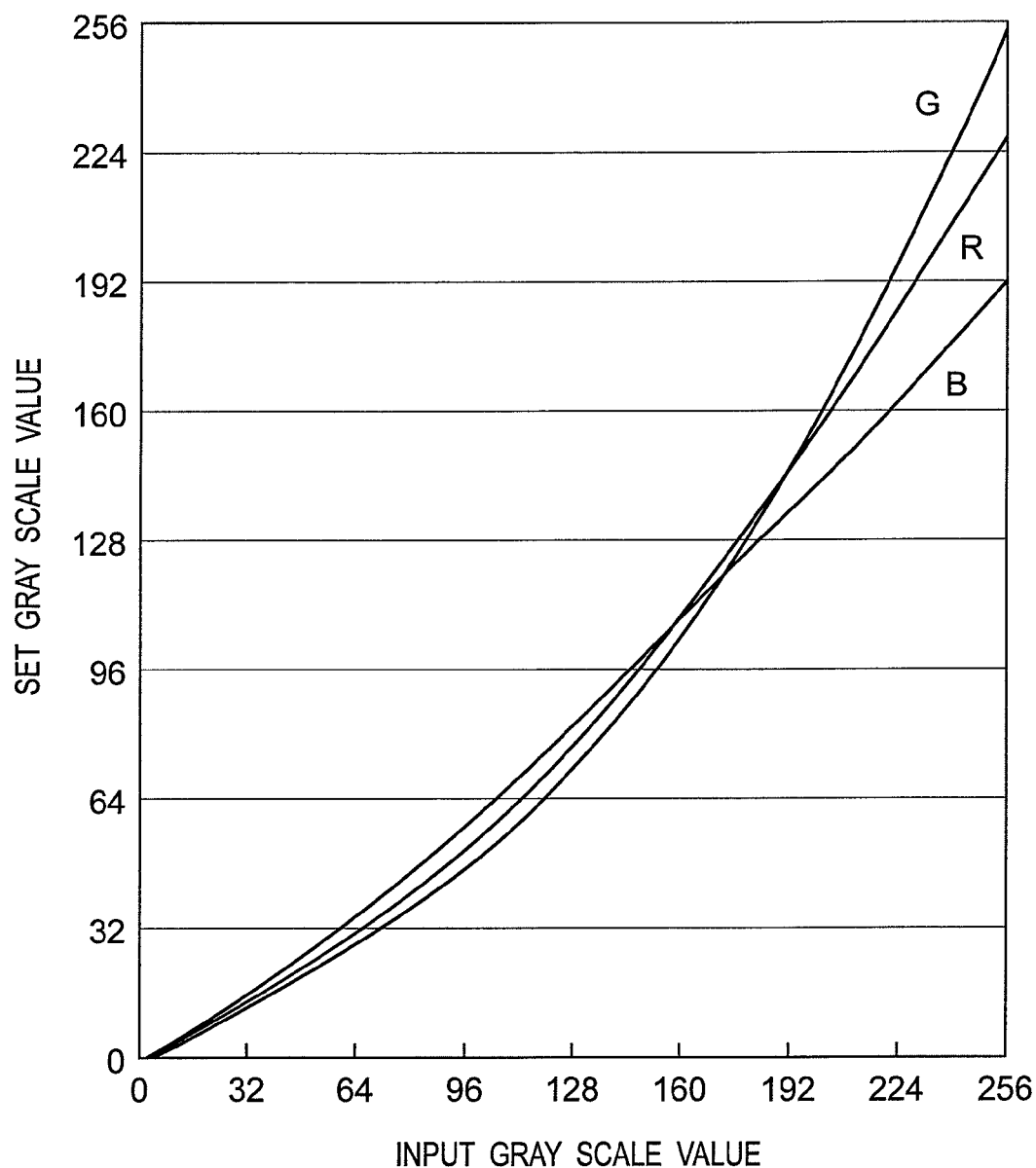
FIG. 3 is a diagram showing a conversion table for input gray scale values and set gray scale values.
Figure 4:
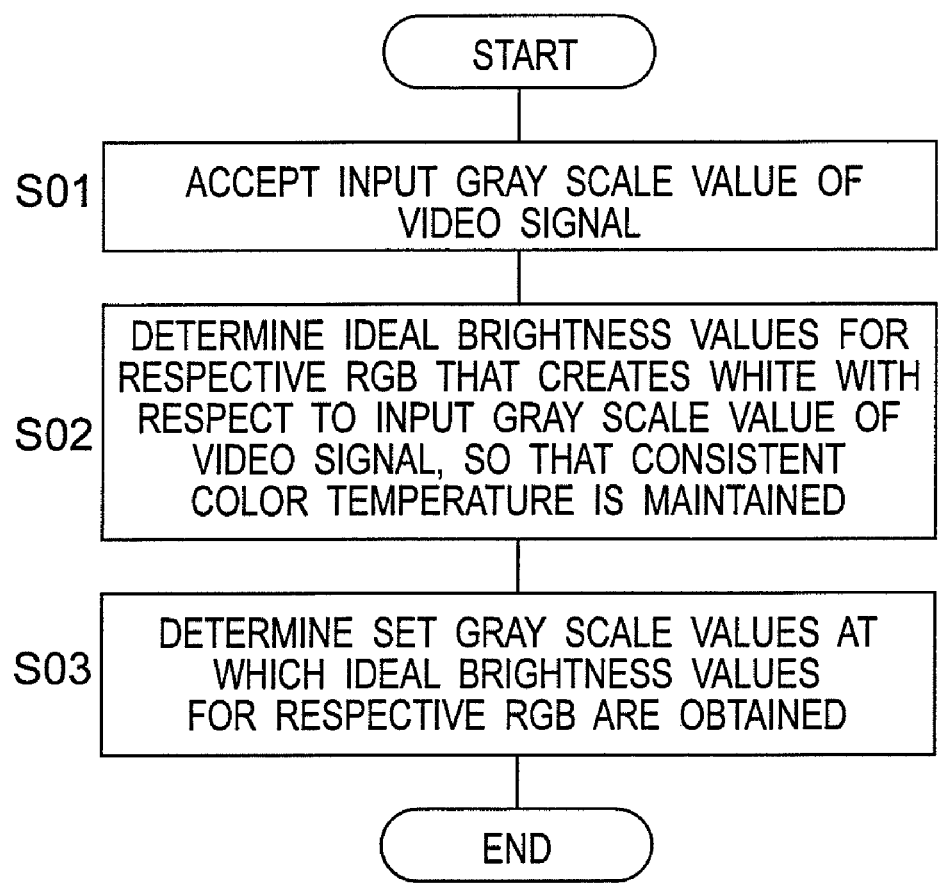
FIG. 4 is a flowchart of the color temperature correction method according to the first embodiment of the present invention.

A color temperature correction method performed by the color temperature correction device 10 will be described using FIGS. 2 and 3 and a flowchart in FIG. 4.

a) An input gray scale value of a video signal is accepted (S01).

b) As shown in FIG. 2, ideal brightness values for respective RGB that creates white are set in advance with respect to an input gray scale value of a video signal, so that a consistent color temperature is maintained. The relationship of the ideal brightness values to the input gray scale value is represented as a first gray scale value conversion table (FIG. 2: dash-dotted lines). Hence, based on the first gray scale value conversion table, ideal brightness values for the respective RGB that creates white are determined with respect to the input gray scale value (S02). For example, in the case of FIG. 2, when a video signal with an input gray scale value of 230 is inputted, the ideal brightness value of red (R) is 105 (FIG. 2: procedure (i)). Note that although ideal brightness values for green (G) and blue (B) are also similarly obtained, the detail thereof is omitted.

c) Next, as shown in FIG. 2, the relationship to measured brightness values that are actually obtained with respect to the gray scale value is represented by a second gray scale value conversion table (FIG. 2: solid lines). Hence, based on the second gray scale value conversion table, set gray scale values at which the ideal brightness values for the respective RGB are obtained are determined (S03). In the case of FIG. 2, since an ideal brightness value of 105 is outputted, a set gray scale value of 220 is obtained (FIG. 2: procedure (ii)). Note that although set gray scale values for green (G) and blue (B) are also similarly obtained, the detail thereof is omitted.

In the above-described manner, set gray scale values for respective RGB that creates white are obtained with respect to an input gray scale value so that a consistent color temperature is maintained. In the above-described example, an input gray scale value of 230 is converted to a set gray scale value of 220. Note that the relationship of the set gray scale values for the respective RGB that creates white to the input gray scale value to maintain a consistent color temperature is represented as a gray scale value conversion table, as shown in FIG. 3. The gray scale value conversion table (FIG. 3) can be represented as a combination of the above-described first gray scale value conversion table (FIG. 2: dash-dotted lines) and second gray scale value conversion table (FIG. 2: solid lines).

Figure 5:
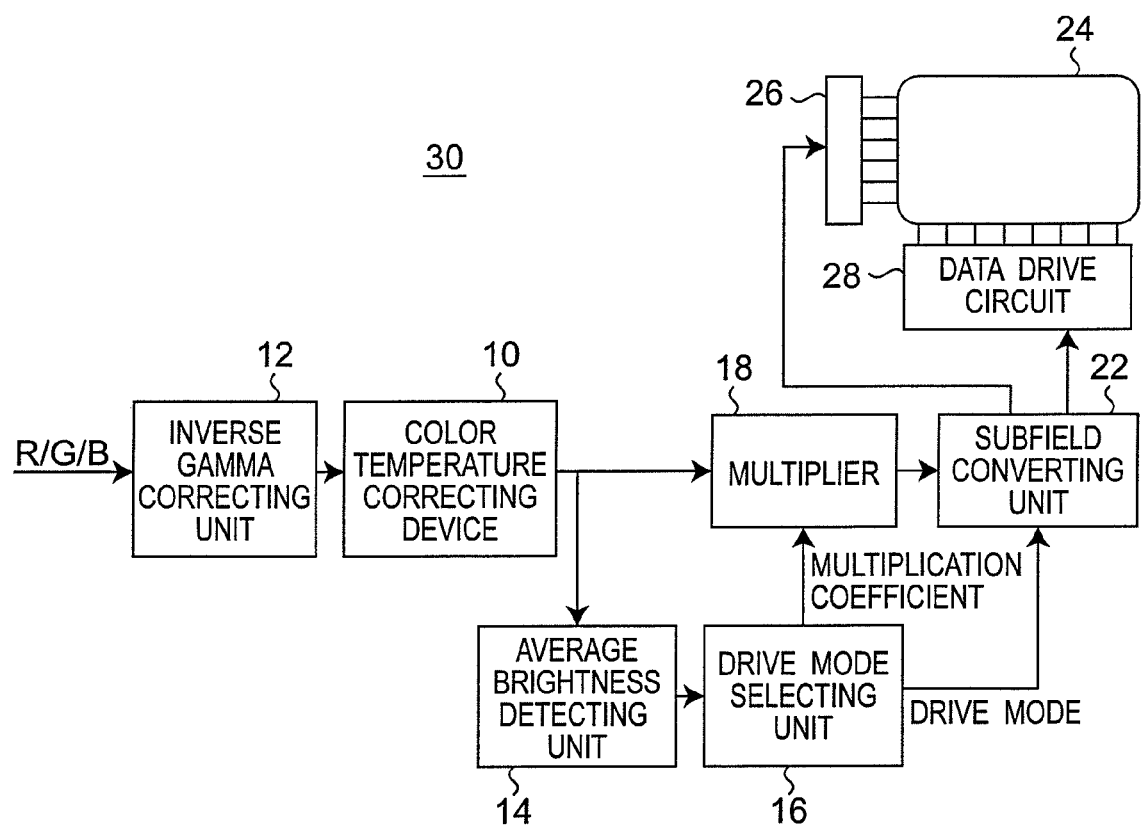
FIG. 5 is a block diagram showing a configuration of a plasma display device according to the first embodiment of the present invention.

A configuration of a plasma display device 30 according to the first embodiment of the present invention will be described using FIG. 5. The plasma display device 30 is configured by an inverse gamma correcting unit 12 of performing inverse gamma correction on a gamma-corrected video signal; a color temperature correcting device 10 that performs color temperature correction by converting an input gray scale value of the video signal that is inverse-gamma-corrected by the inverse gamma correction means, to set gray scale values for respective RGB that creates white, so that a consistent color temperature is maintained; an average brightness detecting unit 14 of detecting average brightness of the color-temperature-corrected video signal; a drive mode selecting unit 16 of selecting a drive mode (drive factor) based on the detected average brightness and outputting a multiplication coefficient according to the drive mode; a multiplier 18 that multiplies the color-temperature-corrected video signal by the outputted multiplication coefficient to output gray scale values in which a brightness difference caused by the drive mode is corrected; a subfield converting unit 22 of performing settings (drive factor, the number of subfields, etc.) of subfields based on information on the set drive mode; a plasma display panel (PDP) 24 for displaying video; a scanning/sustain/erase drive circuit 26 that performs control of scanning, sustaining, and erasing based on setting values of the subfields; and a data drive circuit 28. The plasma display apparatus 30 is characterized in including the above-described color temperature correction device 10. Since the plasma display device 30 includes the color temperature correction device 10, color temperature correction can be performed so that a consistent color temperature is maintained.

Second Embodiment

Figure 6:
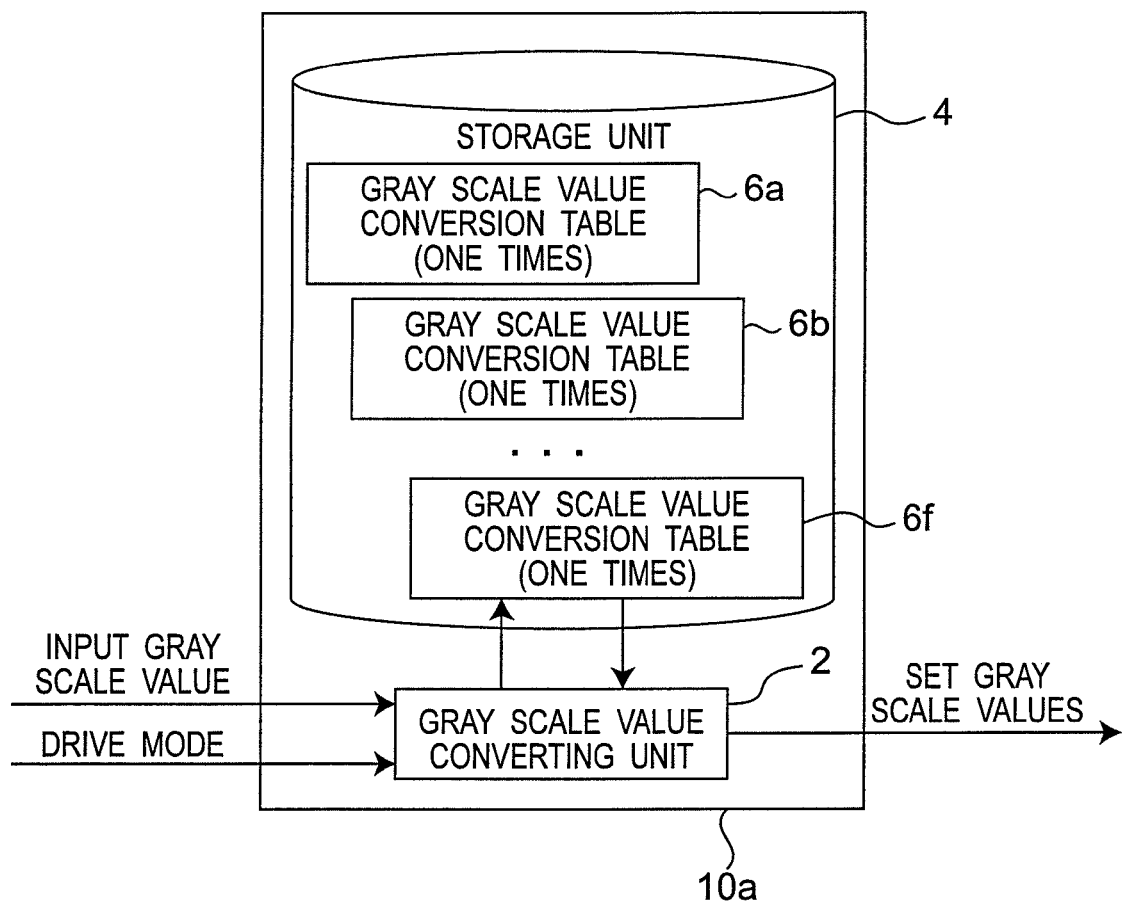
FIG. 6 is a block diagram showing a configuration of a color temperature correction device according to a second embodiment of the present invention.

A color temperature correction device 10a according to a second embodiment of the present invention will be described using a block diagram of FIG. 6. The color temperature correction device 10a according to the second embodiment is different from the color temperature correction device according to the first embodiment in that the device 10a has gray scale value conversion tables 6a, 6b, ... 6f for a plurality of respective drive modes. Since the color temperature correction device 10a thus has the plurality of gray scale value conversion tables 6a, 6b, ... 6f for the respective drive modes, a conversion from an input gray scale value to set gray scale values can be appropriately performed based on a gray scale value conversion table corresponding to a selected drive mode.

Figure 7:
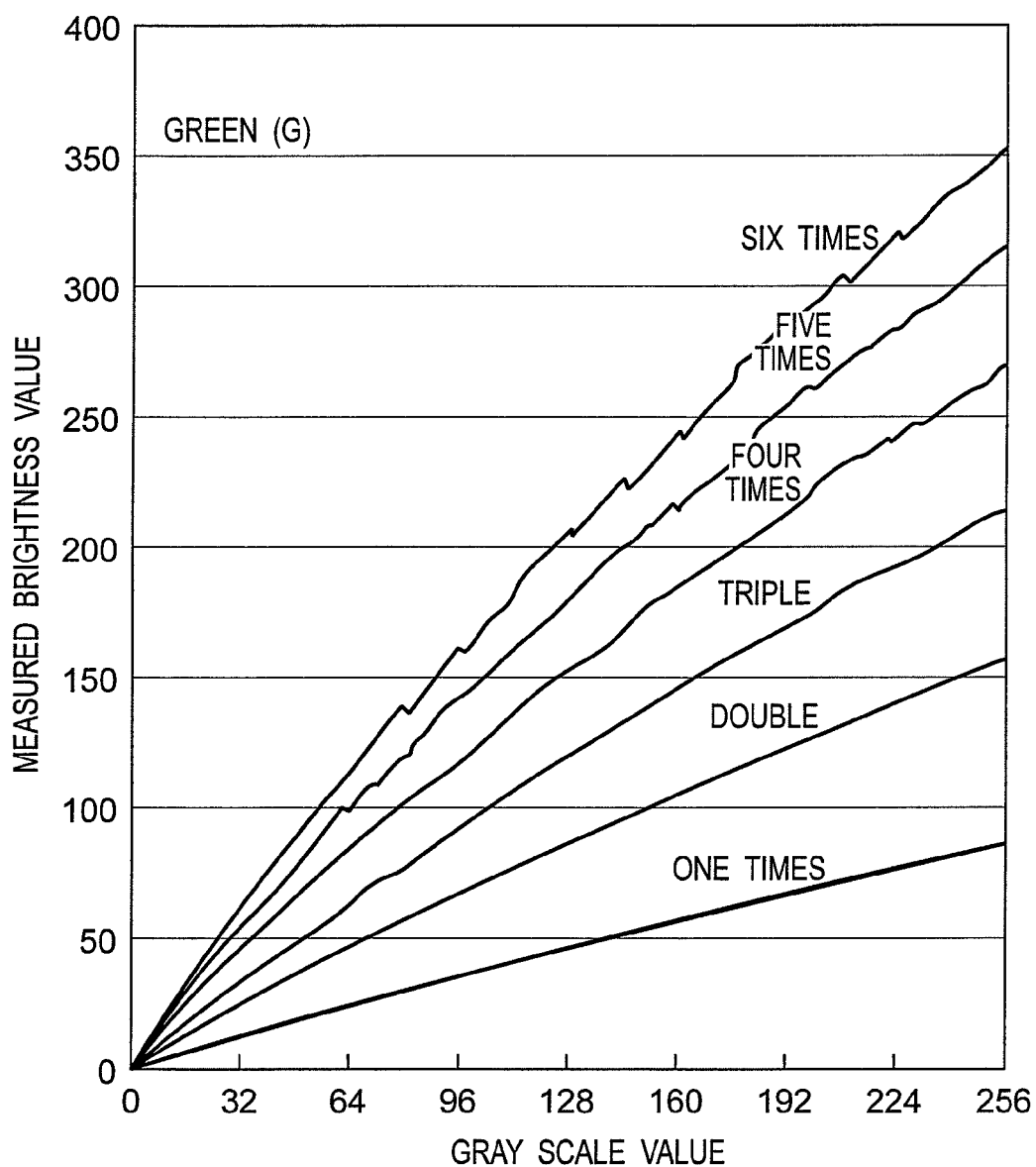
FIG. 7 is a diagram showing the relationship between gray scale value and measured brightness value of green (G) for drive modes (one times to six times)

Next, the features of the color temperature correction device 10a will be described using FIG. 7. FIG. 7 is a diagram showing the relationship between gray scale value and measured brightness value of green (G) for one-times to six-times drive modes. The color temperature correction device according to the above-described first embodiment has only one gray scale value conversion table for an input gray scale value for a specific drive mode. However, in the current plasma display panel, various drive modes (drive factors) are used depending on the average brightness. For example, in the case of an integral multiple from one to six, alternatively, drive modes with drive factors including decimal places, such as 0.9 times, 1.1 times, and 1.3 times, are used. In this case, as shown in FIG. 7, when the drive mode is changed, the ideal brightness value is different for the same input gray scale value, and moreover, a change in ideal brightness value is not proportional to the factor of the drive mode. Therefore, even when color temperature correction is performed for a specific drive mode, if, thereafter, a drive mode different from the specific drive mode is set, then the color temperature changes. Hence, for color temperature correction, a conversion from an input gray scale value to set gray scale values according to a selected drive mode needs to be performed. In this case, a gray scale value conversion table for input gray scale values to set gray scale values is different for different drive modes and each gray scale value conversion table is not proportional to the factor of the drive mode. Hence, the color temperature correction device 10a according to the second embodiment has the plurality of gray scale value conversion tables 6a, 6b, ... 6f for the respective drive modes. By this, a conversion from an input gray scale value to set gray scale values can be appropriately performed based on a gray scale value conversion table corresponding to a selected drive mode.

Figure 8:
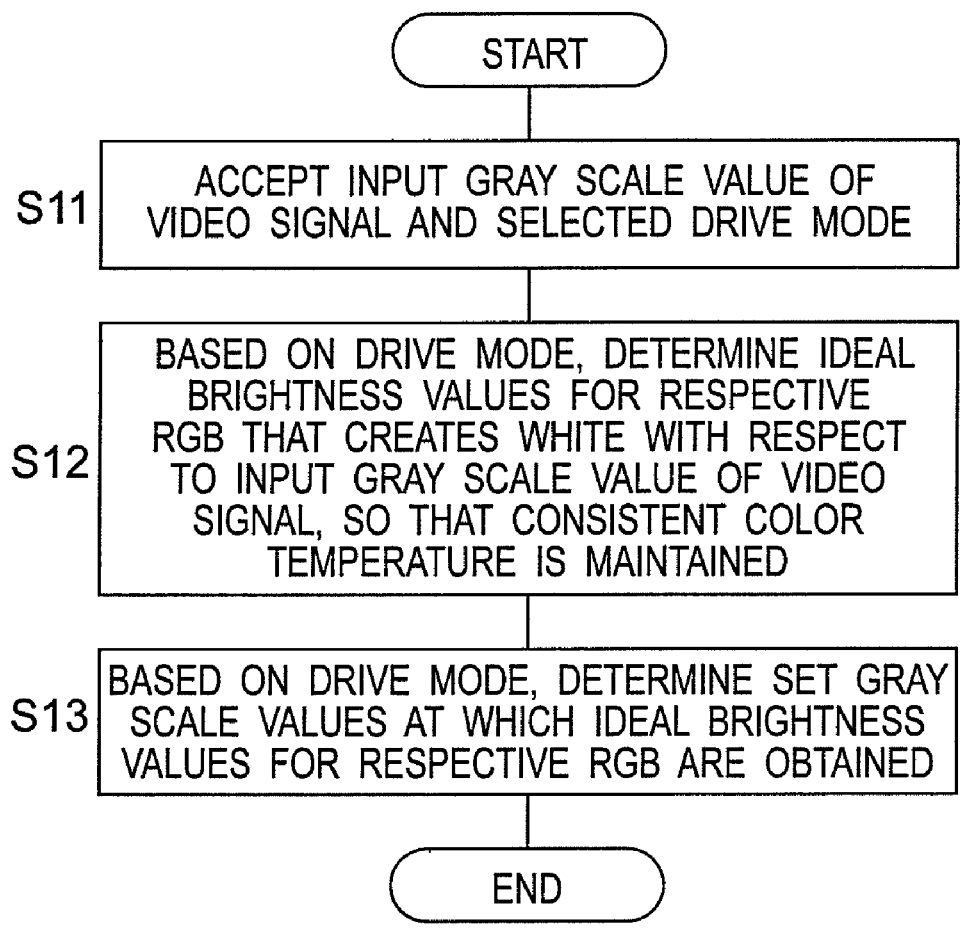
FIG. 8 is a flowchart of a color temperature correction method according to the second embodiment of the present invention.

A color temperature correction method performed by the color temperature correction device 10a will be described using a flowchart in FIG. 8.

a) An input gray scale value of a video signal and a selected drive mode are accepted (S11).

b) Ideal brightness values for respective RGB that creates white are set in advance with respect to an input gray scale value of a video signal and for each drive mode, to maintain a consistent color temperature. The relationship of the ideal brightness values to the input gray scale value is represented as a first gray scale value conversion table. Hence, based on a first gray scale value conversion table corresponding to the selected drive mode, ideal brightness values for the respective RGB that creates white are determined with respect to the input gray scale value (S12).

c) Next, for each drive mode, it is represented by a second gray scale value conversion table showing the relationship of a measured brightness value to a gray scale value. Hence, based on a second gray scale value conversion table corresponding to the selected drive mode, set gray scale values at which the ideal brightness values for the respective RGB are obtained are determined (S13).

In the above-described manner, based on a selected drive mode, set gray scale values for respective RGB that creates white are obtained with respect to an input gray scale value, so that a consistent color temperature is maintained.

Figure 9:
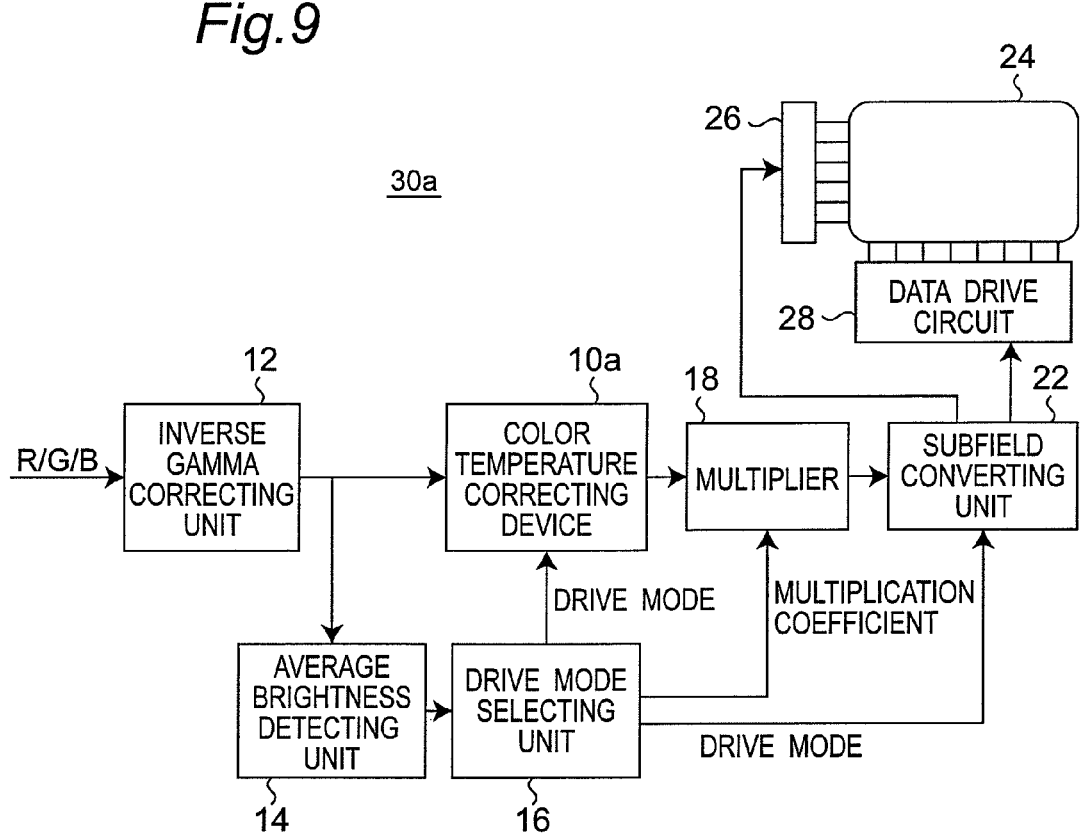
FIG. 9 is a block diagram showing a configuration of a plasma display device according to the second embodiment of the present invention.

A configuration of a plasma display device 30a according to the second embodiment of the present invention will be described using FIG. 9. The plasma display device 30a is different from the plasma display device according to the first embodiment in that prior to an input to a color temperature correction device 30a, average brightness of a video signal is detected by an average brightness detecting unit 14, a drive mode is selected by a drive mode selecting unit 16 based on the average brightness, and the color temperature correcting device 10a accepts an input in the drive mode selected by the drive mode selecting unit 16. According to the plasma display device 30a, since an input gray scale value can be converted to set gray scale values based on a gray scale value conversion table corresponding to a selected drive mode, even when various drive modes are selected, a consistent color temperature can be maintained.

Third Embodiment

Figure 10:
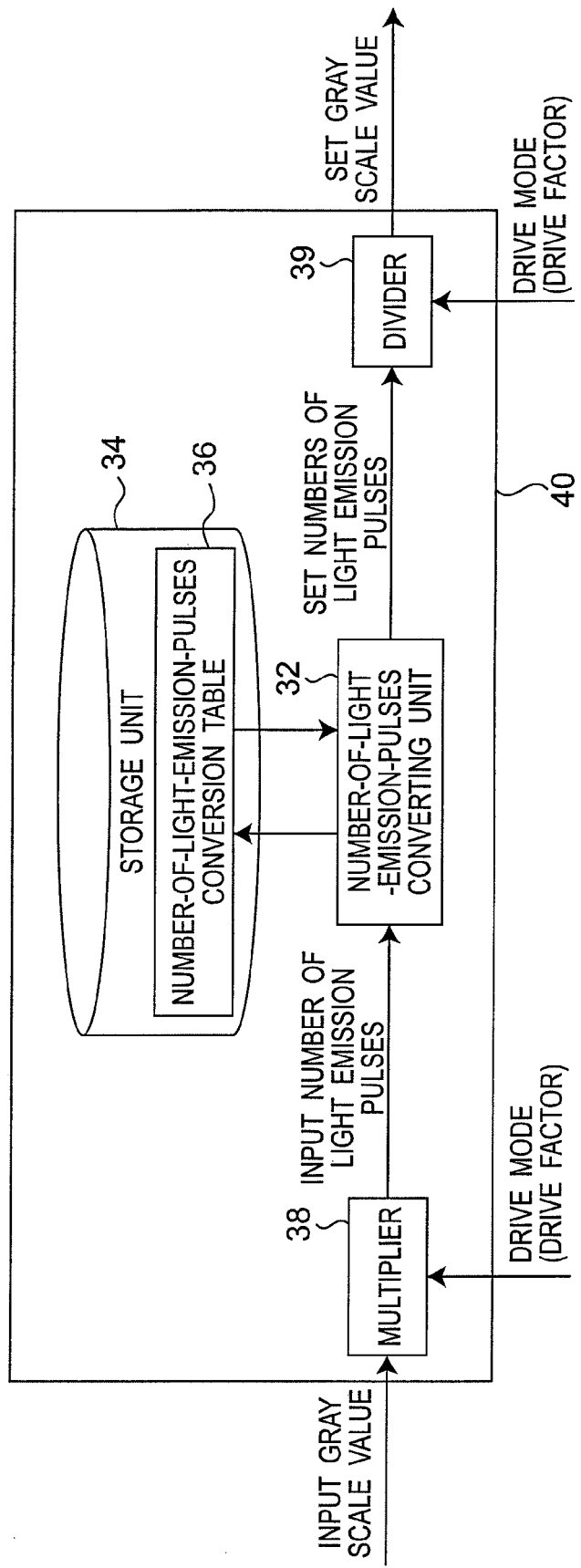
FIG. 10 is a block diagram showing a configuration of a color temperature correction device according to a third embodiment of the present invention.
Figure 11:
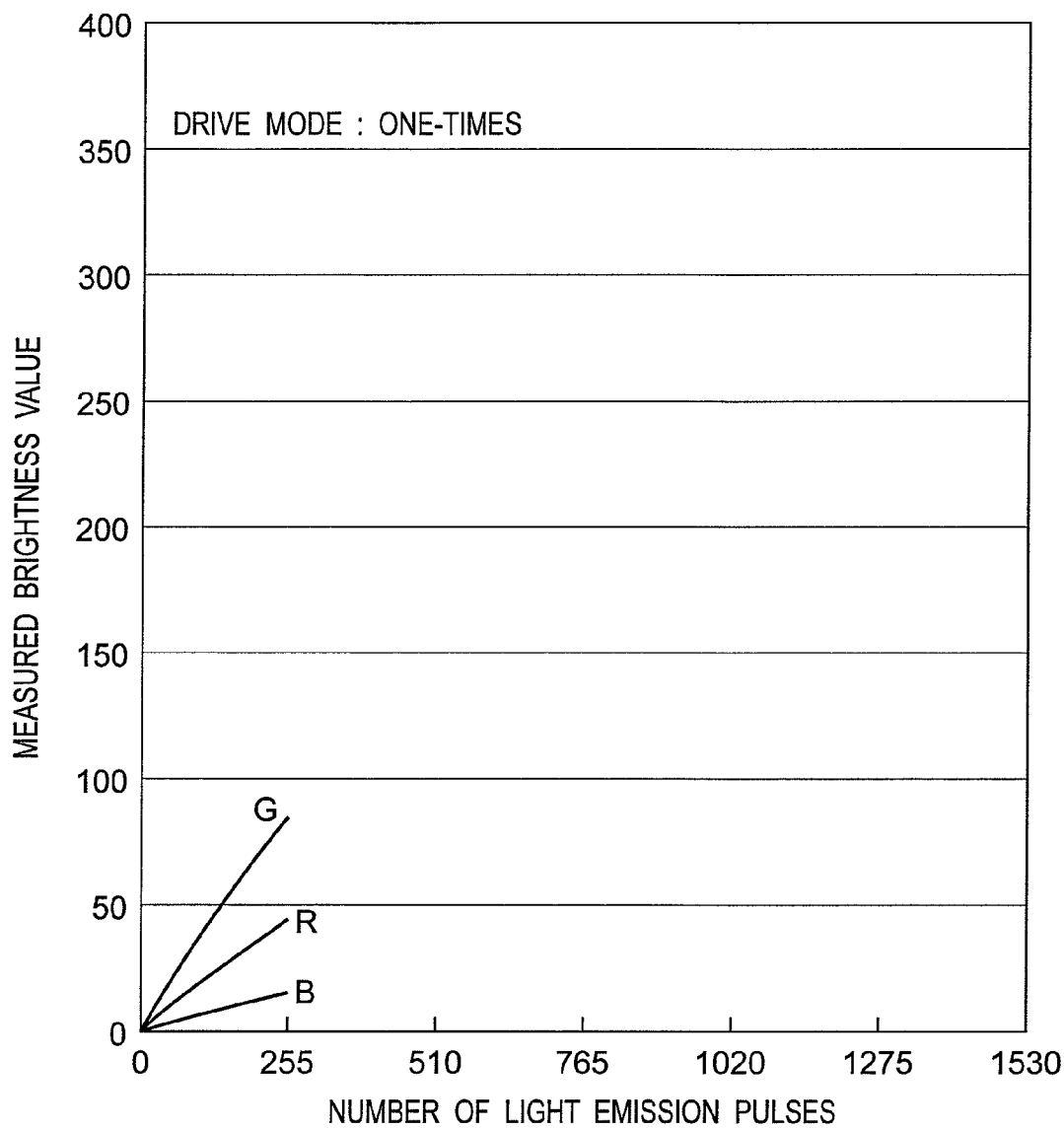
FIG. 11 is a diagram showing the relationship between the number of light emission pulses and measured brightness value for the case of a one-times drive mode.
Figure 12:
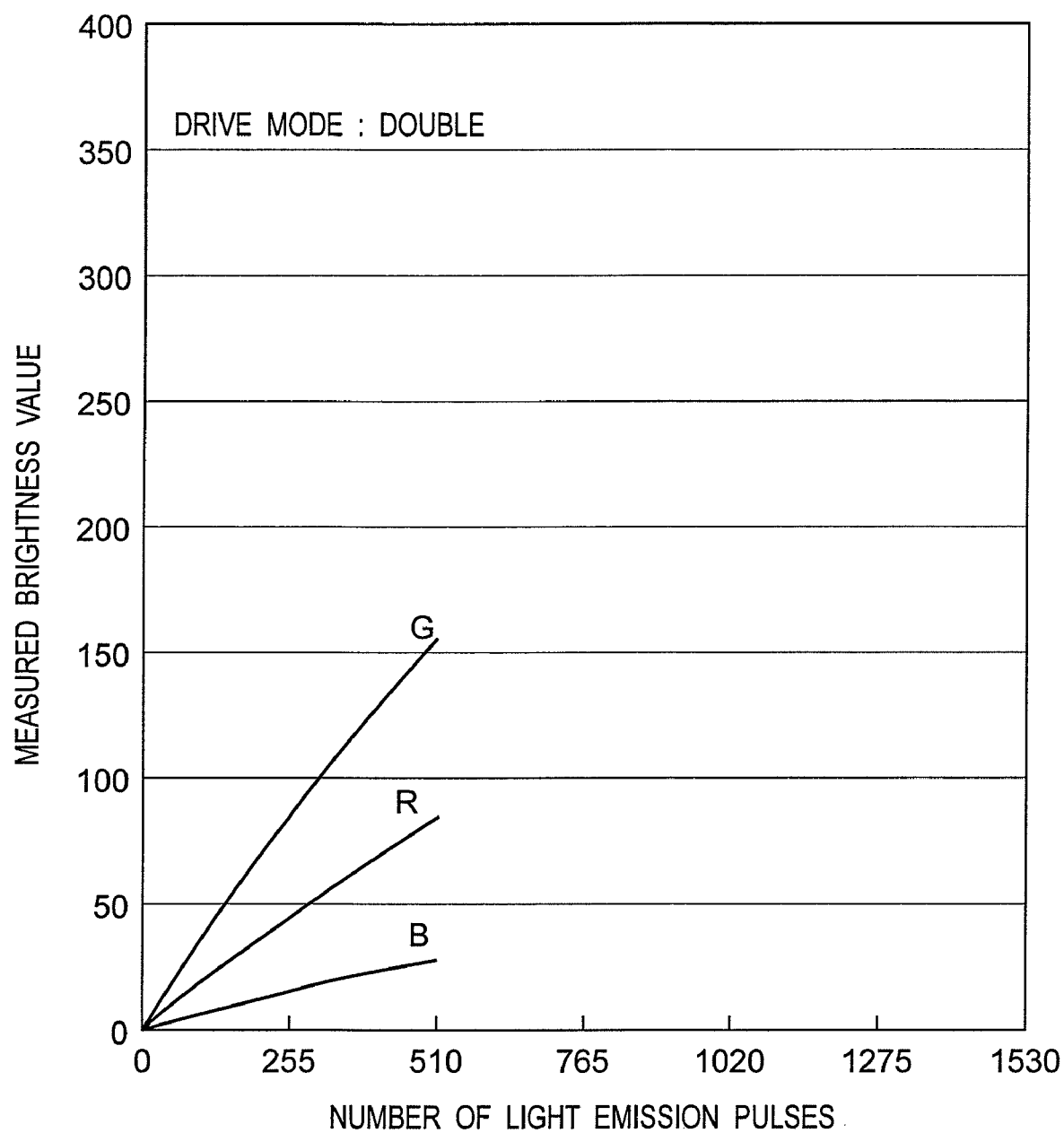
FIG. 12 is a diagram showing the relationship between the number of light emission pulses and measured brightness value for the case of a double drive mode.
Figure 13:
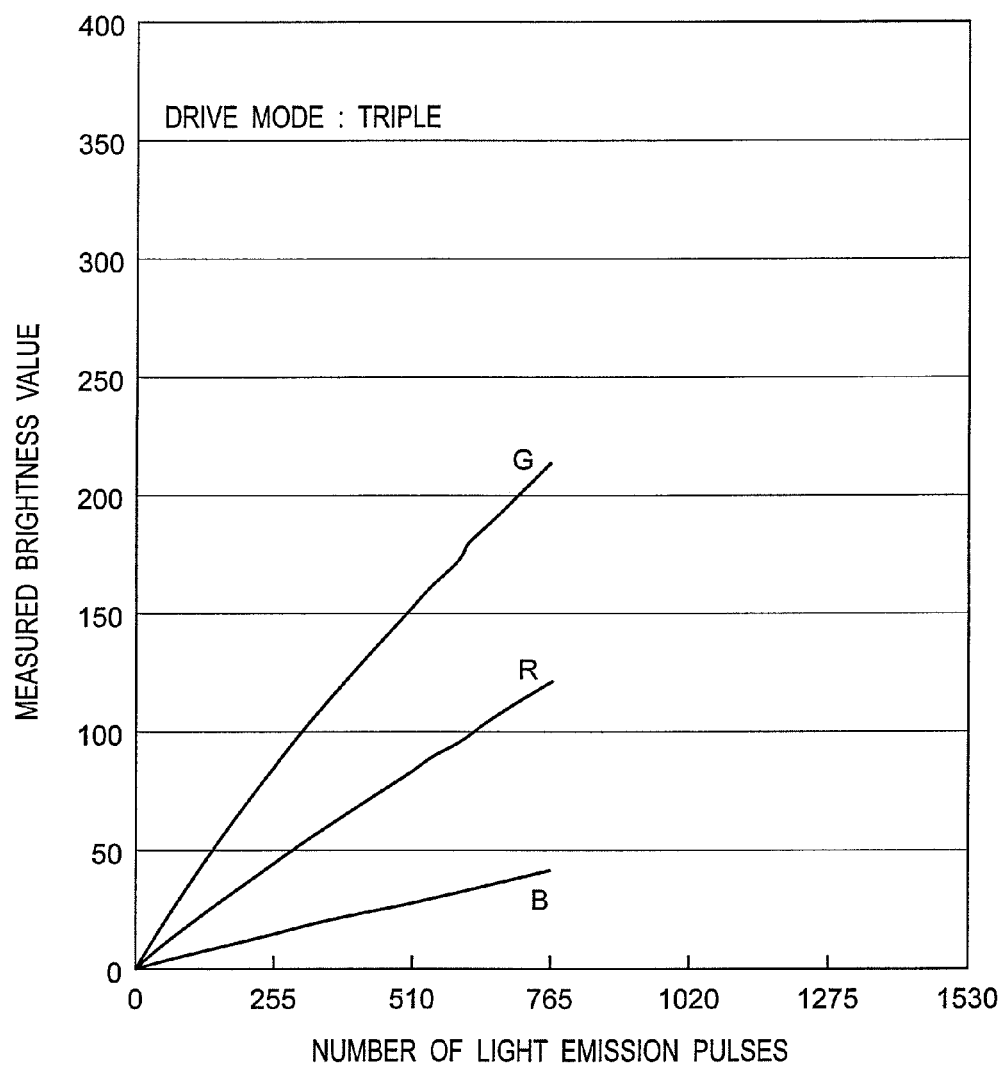
FIG. 13 is a diagram showing the relationship between the number of light emission pulses and measured brightness value for the case of a triple drive mode.
Figure 14:
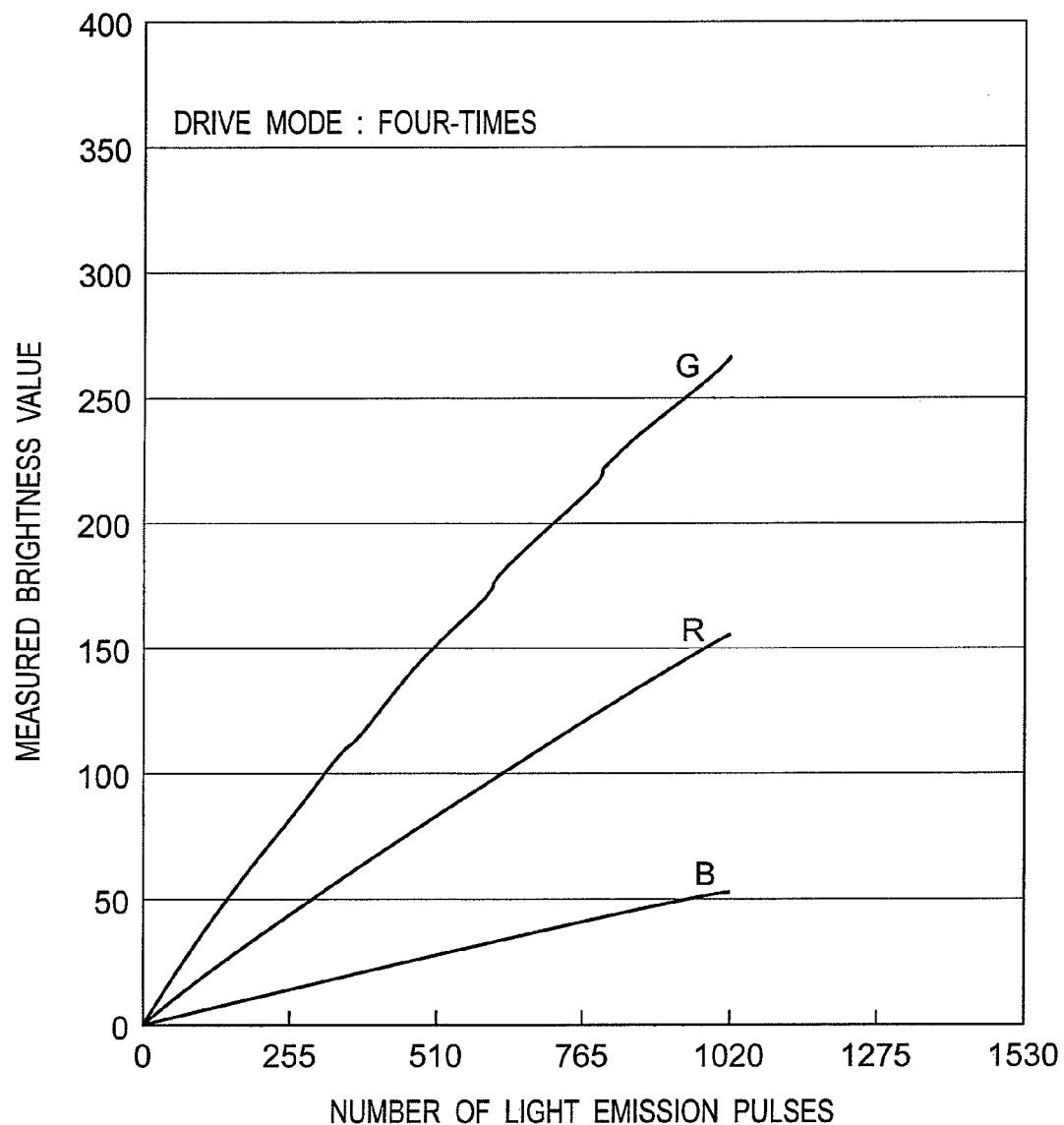
FIG. 14 is a diagram showing the relationship between the number of light emission pulses and measured brightness value for the case of a four-times drive mode.
Figure 15:
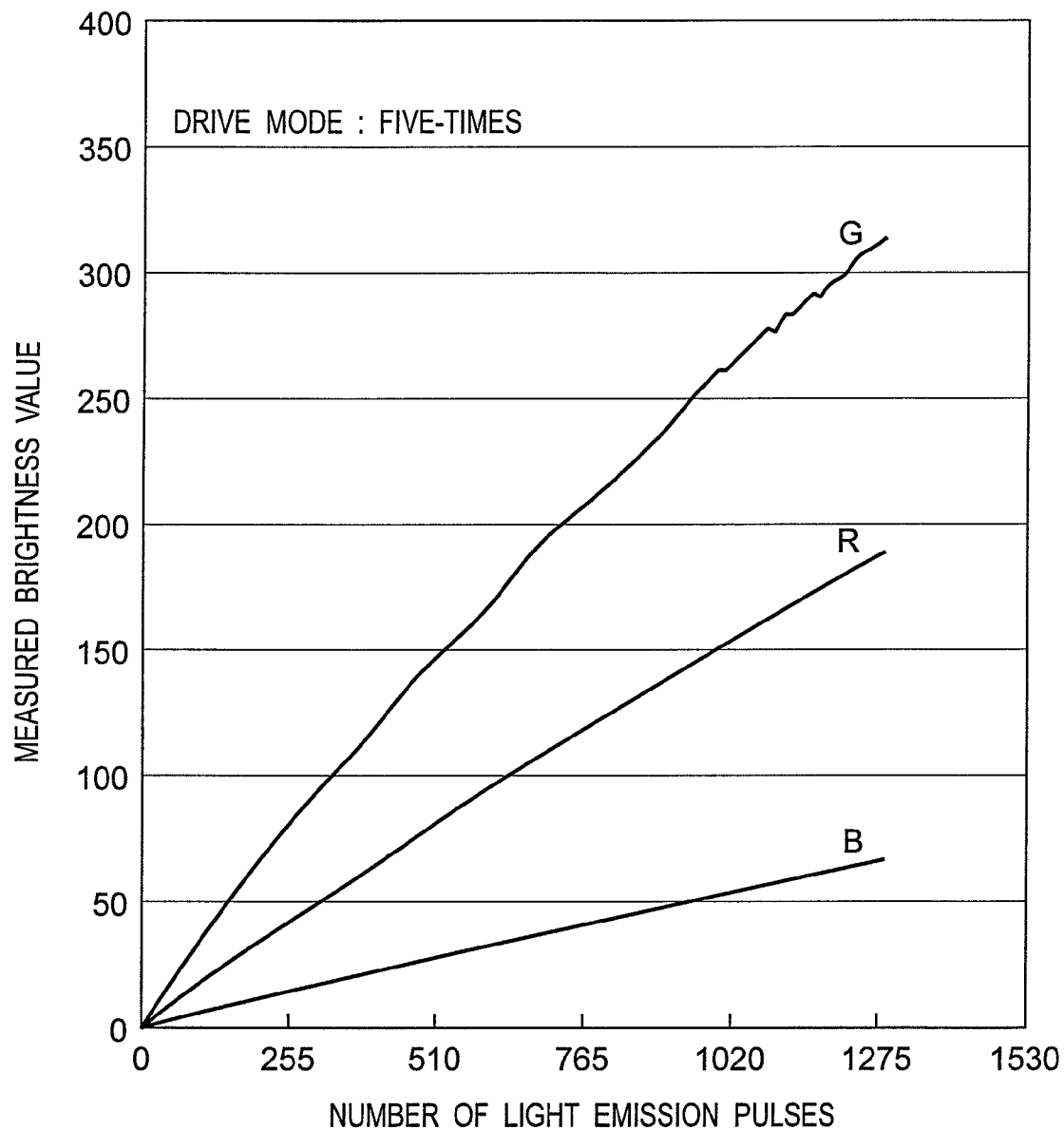
FIG. 15 is a diagram showing the relationship between the number of light emission pulses and measured brightness value for the case of a five-times drive mode.
Figure 16:
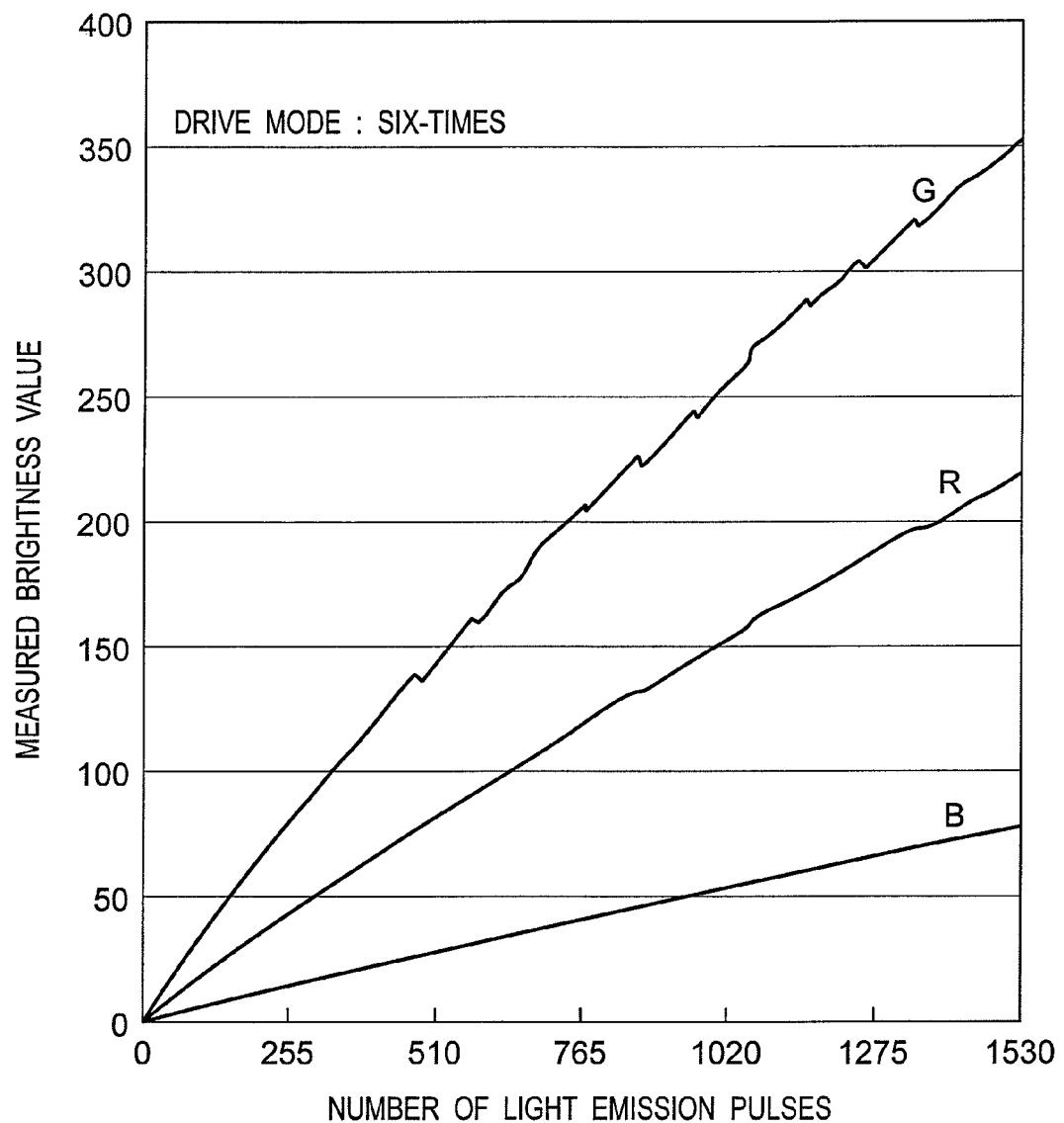
FIG. 16 is a diagram showing the relationship between the number of light emission pulses and measured brightness value for the case of a six-times drive mode.

A color temperature correction device 40 according to a third embodiment of the present invention is different from the color temperature correction devices according to the first and second embodiments in that instead of an input gray scale value of a video signal, an input number of light emission pulses that is obtained by multiplying an input gray scale value by a drive factor of a selected drive mode, is converted to set numbers of light emission pulses so that a consistent color temperature is maintained. As shown in FIG. 10, the color temperature correction device 40 includes a multiplier 38 that multiplies an input gray scale value of a video signal by a drive factor of a selected drive mode and outputs an input number of light emission pulses; a number-of-light-emission-pulses converting unit 32 that converts the input number of light emission pulses to set numbers of light emission pulses so that a consistent color temperature is maintained; a storage unit 34 that records a number-of-light-emission-pulses conversion table 36 showing the relationship between the input number of light emission pulses and the set number of light emission pulses for respective RGB that creates white to maintain a consistent color temperature; and a divider 39 that divides the set numbers of light emission pulses by the above-described drive factor and outputs set gray scale values. According to the color temperature correction device, instead of an input gray scale value itself, an input number of light emission pulses that is obtained by multiplying the input gray scale value by a drive factor is converted to set numbers of light emission pulses using a single conversion table for input numbers of light emission pulses to set numbers of light emission pulses, so that a consistent color temperature is maintained. Therefore, color temperature correction can be performed without receiving any influence caused by different drive modes. Hence, without the need for conversion tables provided for respective drive modes and without increasing the storage capacity of the storage unit 34, color temperature correction according to all drive patterns can be performed.

Figure 17:
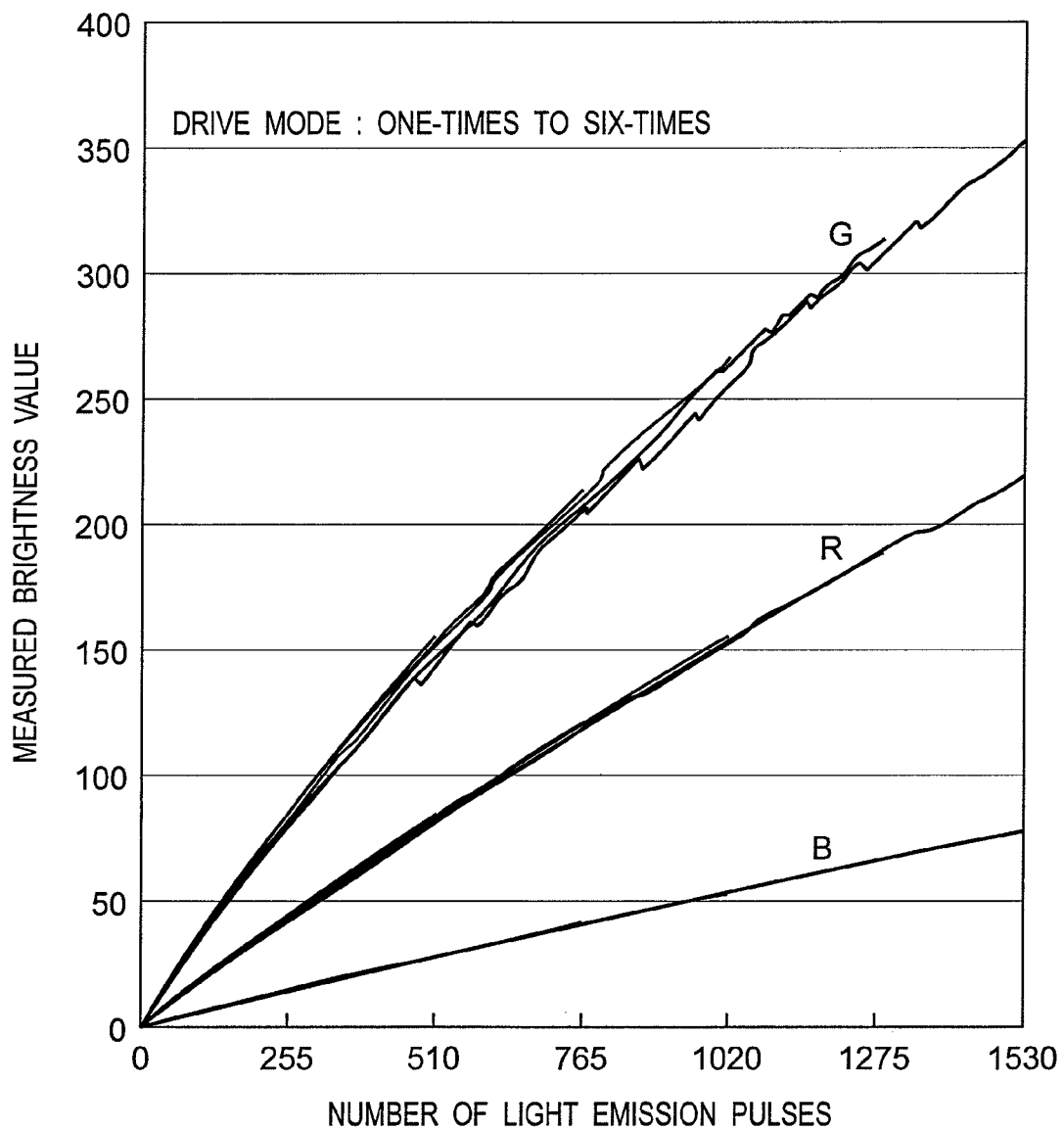
FIG. 17 is a diagram showing the relationship between the number of light emission pulses and measured brightness value for all drive modes in the color temperature correction device according to the third embodiment of the present invention.

The color temperature correcting device 40 has a feature of performing color temperature correction on the number of light emission pulses instead of on a gray scale value. Advantageous effects brought about by performing color temperature correction on the number of light emission pulses will be described below using FIGS. 11 to 17. FIGS. 11 to 16 are diagrams showing the relationship between the number of light emission pulses and measured brightness value for the respective cases of a one-times drive mode to a six-times drive mode. The number of light emission pulses represents the number of light emission pulses indicating by how many light emission pulses a gray scale value of a video signal is represented. The number of light emission pulses is calculated by multiplying a gray scale value by a drive factor of a drive mode. As shown in FIGS. 11 to 16, it can be seen that as the drive factor increases the number of light emission pulses increases and accordingly the measured brightness value also increases. FIG. 17 shows the relationship between the number of light emission pulses and measured brightness value for all drive modes from the one-times drive mode to the six-times drive mode, in an overlapping manner. As shown in FIG. 17, it can be seen that the relationship between the number of light emission pulses and measured brightness value is placed on substantially the same curve, regardless of drive mode. Therefore, by converting the number of light emission pulses so that a consistent color temperature is maintained, color temperature correction can be performed without receiving any influence caused by a selected drive mode.

Figure 18:
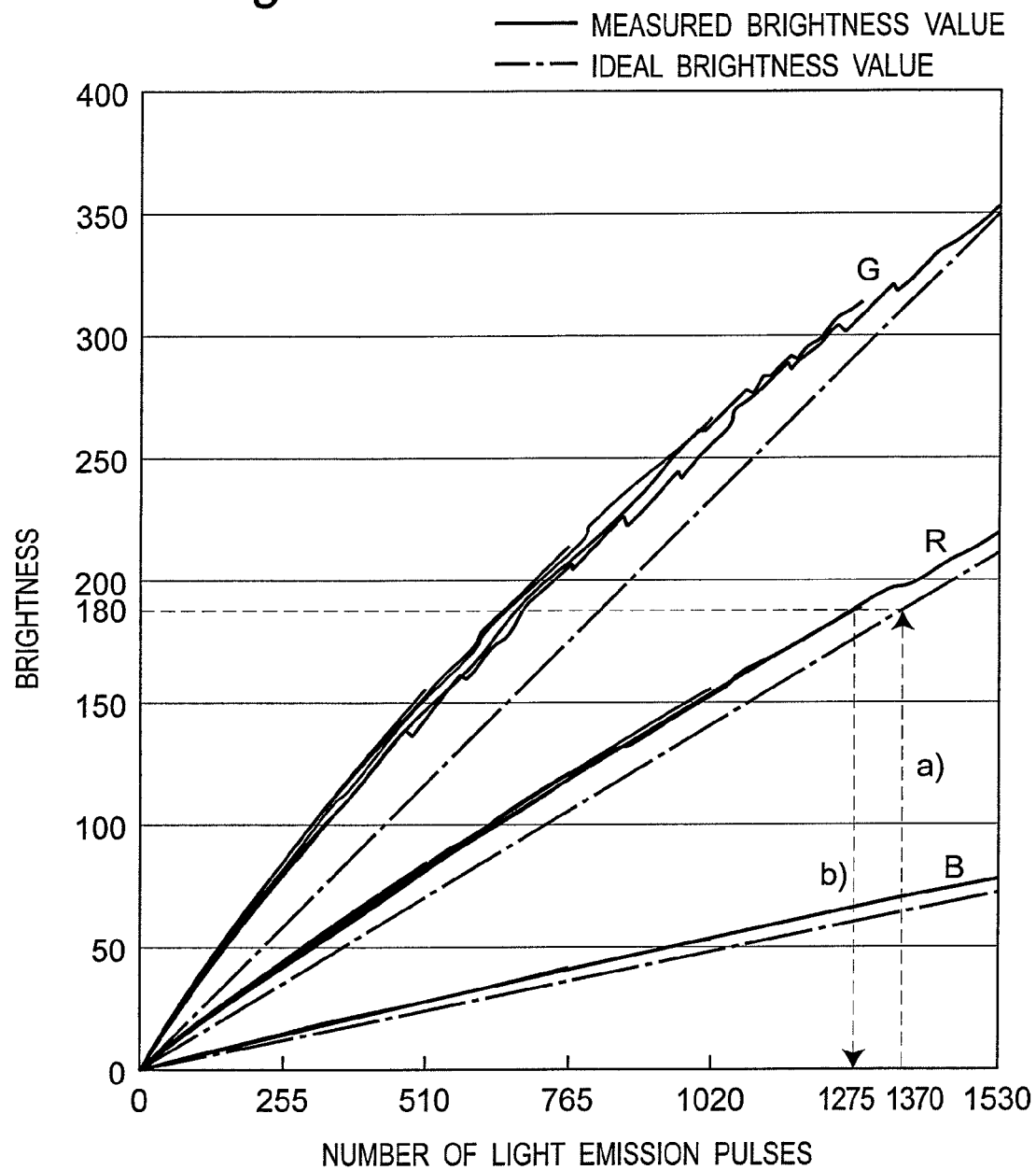
FIG. 18 is a diagram describing a method for conversion of the number of light emission pulses in the color temperature correction device according to the third embodiment of the present invention.
Figure 19:
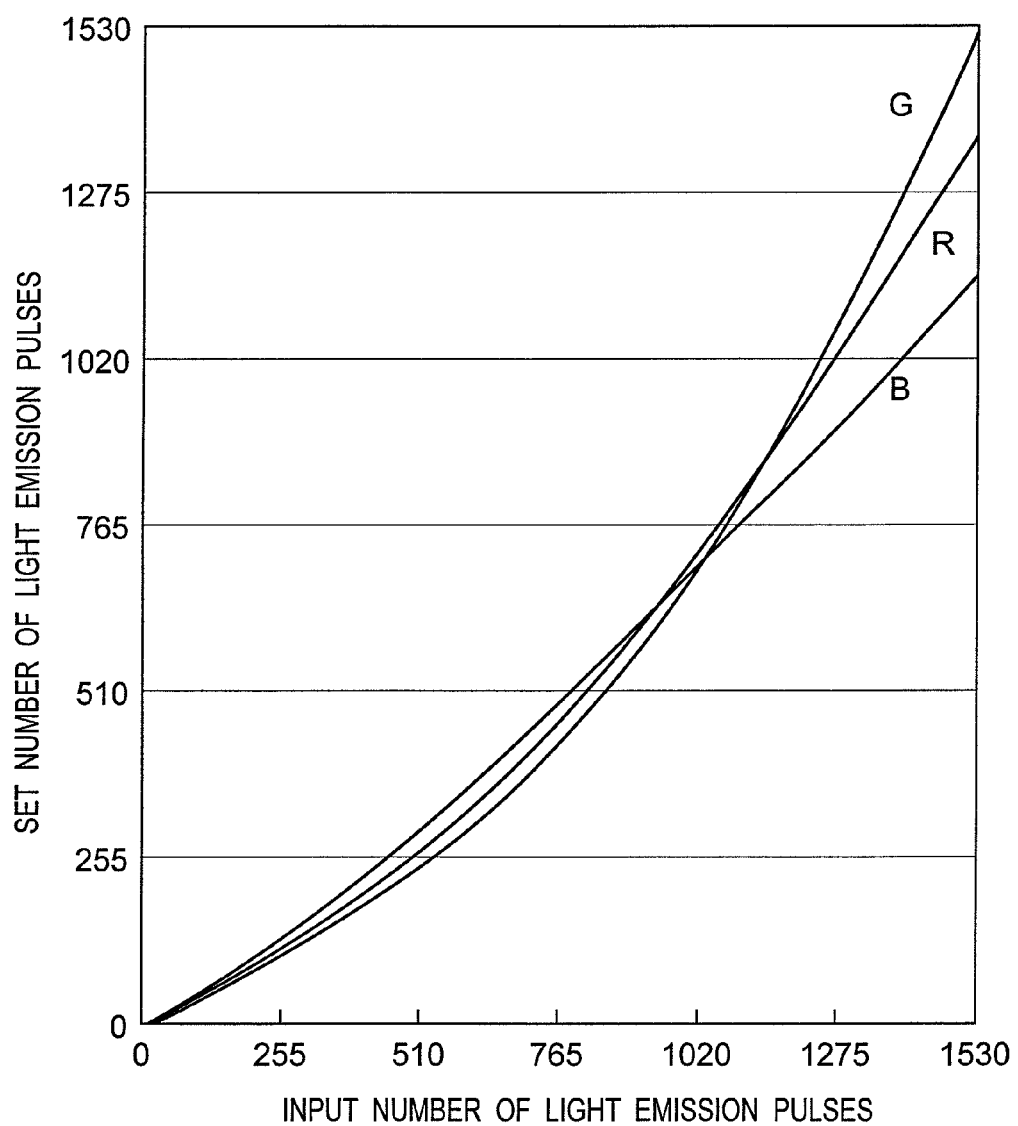
FIG. 19 is a diagram showing a conversion table for the input numbers of light emission pulses and the set numbers of light emission pulses.
Figure 20:
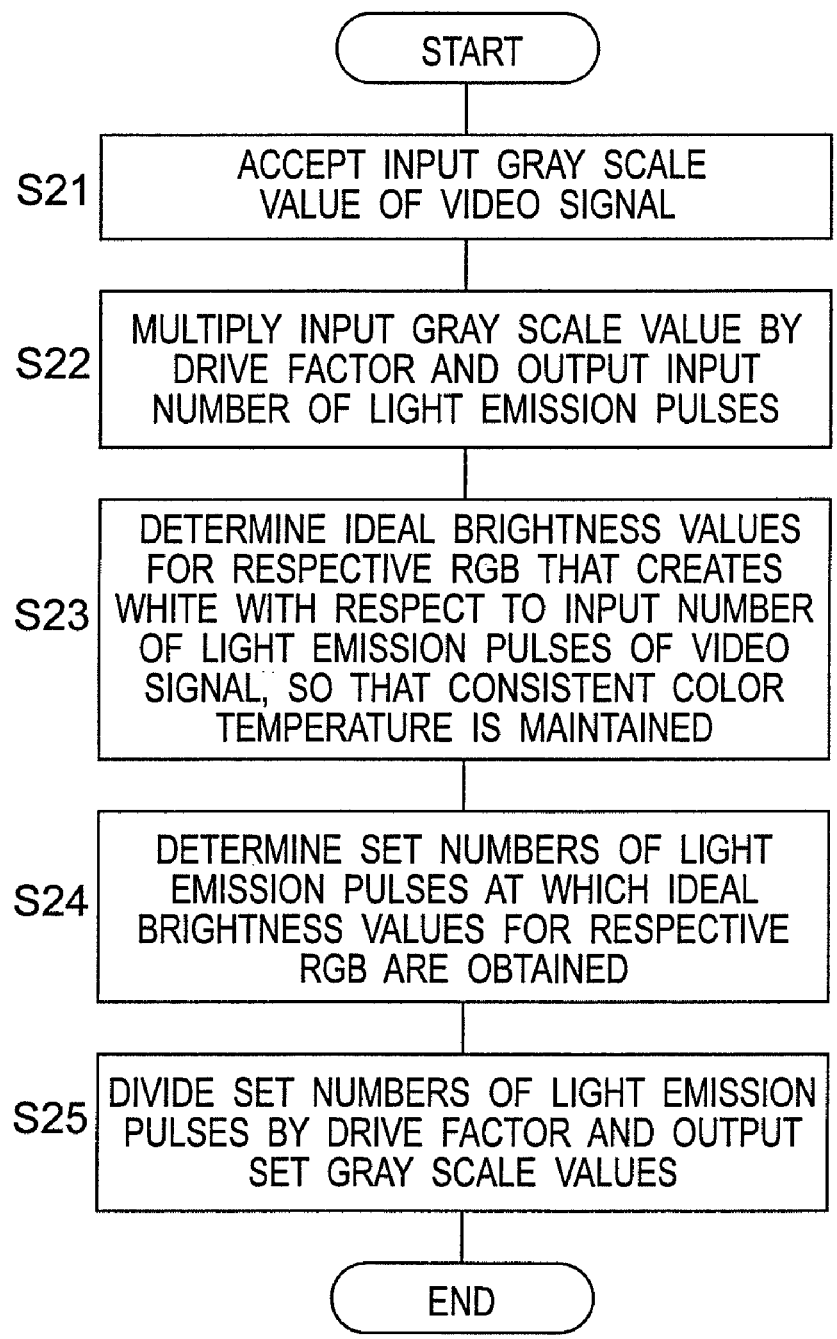
FIG. 20 is a flowchart of a color temperature correction method according to the third embodiment of the present invention.

A color temperature correction method performed by the color temperature correction device 40 will be described using FIGS. 18 and 19 and a flowchart in FIG. 20.

a) An input gray scale value of a video signal is accepted (S21).

b) By the multiplier 38, the input gray scale value is multiplied by a drive factor of a selected drive mode and an input number of light emission pulses is outputted (S22).

c) As shown in FIG. 18, ideal brightness values for respective RGB that creates white are set in advance with respect to the input number of light emission pulses of a video signal, so that a consistent color temperature is maintained. The relationship of the ideal brightness values to the input gray scale value is represented in FIG. 18 as a first number-of-light-emission-pulses conversion table (FIG. 18: dash-dotted lines). Hence, based on the first number-of-light-emission-pulses conversion table, ideal brightness values for the respective RGB that creates white are determined with respect to the input number of light mission pulses (S23). For example, in the case of FIG. 18, with respect to an input number of light emission pulses of 1370, the ideal brightness value for red (R) is 180 (FIG. 18: procedure (a)). Note that although ideal brightness values for green (G) and blue (B) are also similarly obtained, the detail thereof is omitted.

d) Also, the relationship to measured brightness values that are actually obtained with respect to the number of light emission pulses is represented by a second number-of-light-emission-pulses conversion table (FIG. 18: solid lines). Hence, based on the second number-of-light-emission-pulses conversion table, set numbers of light emission pulses at which the ideal brightness values for the respective RGB are obtained are determined (S24). For example, in the case of FIG. 18, as the number of light emission pulses for red (R) at which an ideal brightness value of 180 is outputted, a set number of light emission pulses of 1275 is obtained (FIG. 18: procedure (b)). Note that although set numbers of light emission pulses for green (G) and blue (B) are also similarly obtained, the detail thereof is omitted.

e) By the divider 39, the set numbers of light emission pulses are divided by the above-described drive factor and set gray scale values are outputted (S25).

In the above-described manner, the input number of light emission pulses of a video signal can be converted to set numbers of light emission pulses for respective RGB that creates white, so that a consistent color temperature is maintained. In the above-described example, an input number of light emission pulses of 1370 is converted to a set number of light emission pulses of 1275. Note that the relationship of the set gray scale values for the respective RGB that creates white to the input number of light emission pulses to maintain a consistent color temperature is represented as a number-of-light-emission-pulses conversion table, as shown in FIG. 19. The number-of-light-emission-pulses conversion table can be represented as a combination of the above-described first number-of-light-emission-pulses conversion table and second number-of-light-emission-pulses conversion table.

Figure 21:
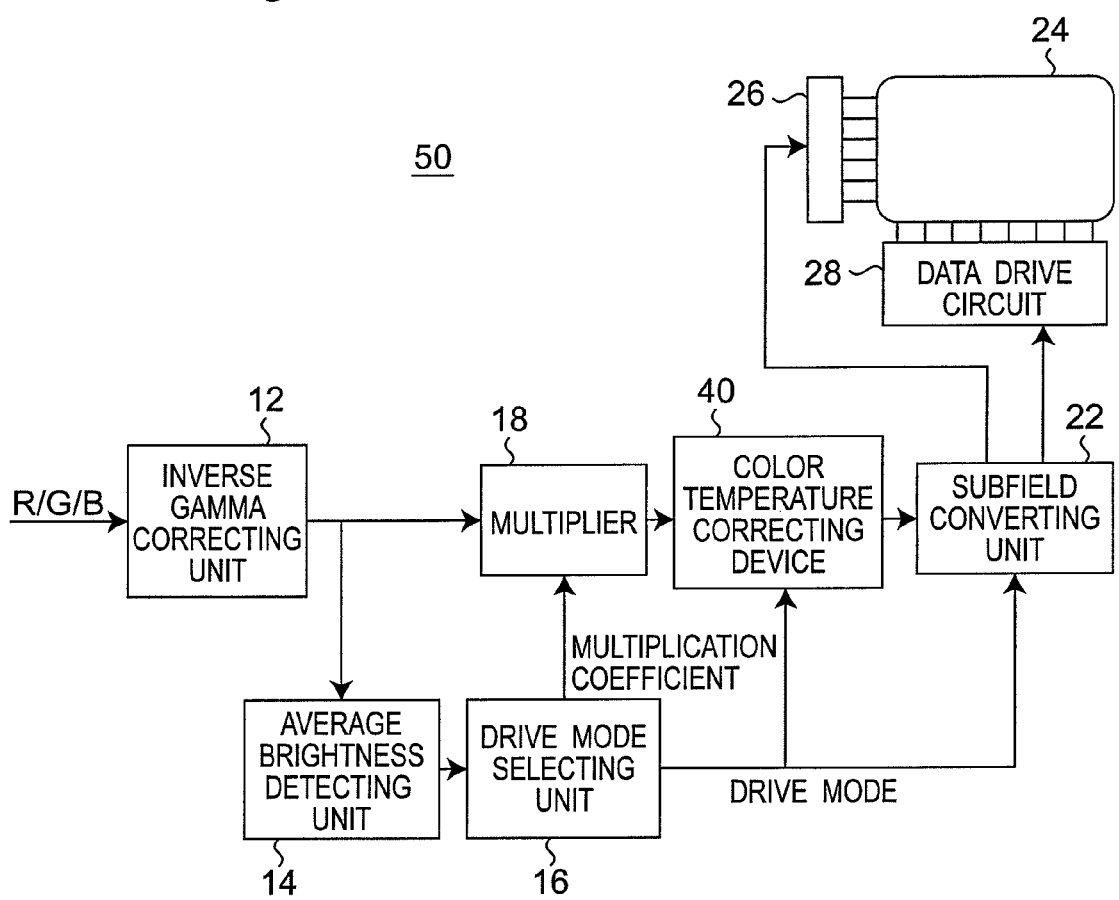
FIG. 21 is a block diagram showing a configuration of a plasma display device according to the third embodiment of the present invention.

A plasma display panel device 50 according to the third embodiment of the present invention will be described using a block diagram of FIG. 21. The plasma display panel device 50 according to the third embodiment is different from the display devices according to the first embodiment and the second embodiment in that the above-described color temperature correction device 40 is connected so as to receive an output obtained after correction of a brightness difference performed according to a drive mode by a multiplier 18. Also, the device 50 is different in that the above-described color temperature correction device 40 performs color temperature correction on the number of light emission pulses instead of on a gray scale value. Therefore, color temperature correction can be performed so that a consistent color temperature is maintained, regardless of selected drive mode. In addition, since there is no need to prepare conversion tables for respective drive modes, without increasing the storage capacity of the storage unit 34 in the color temperature correcting device 40, color temperature correction according to all drive patterns can be performed.

The color temperature correction devices and display devices according to the present invention can be used particularly in plasma display devices.

The invention claimed is:

1. A color temperature correcting device that corrects, in a display device that represents brightness of RGB (Red, Green and Blue) of a video signal using a plurality of levels of gray scales, a color temperature of the video signal, the color temperature correcting device comprising:
a storing unit operable to store a gray scale value conversion table for an input gray scale value of a video signal to set gray scale values for respective RGB so that a consistent color temperature is maintained; and
a gray scale value converting unit operable to convert the input gray scale value to set gray scale values based on the gray scale value conversion table,
wherein the gray scale value conversion table includes:
a first gray scale value conversion table indicating a relationship of ideal brightness values for the respective RGB to the input gray scale value of the video signal to maintain a consistent color temperature; and
a second gray scale value conversion table indicating a relationship to set gray scale values at which the ideal brightness values are obtained.

2. The color temperature correcting device according to claim 1, wherein the gray scale value conversion table uses an input gray scale value to set gray scale values for each drive mode, and
wherein the gray scale value converting unit converts the input gray scale value to set gray scale values based on the gray scale value conversion table and according to a selected drive mode.

3. A display device, comprising:
an inverse gamma correcting unit operable to perform inverse gamma correction on a gamma-corrected video signal;
an average brightness detecting unit operable to detect average brightness of the inverse-gamma-corrected video signal;
a drive mode selecting unit operable to select a drive mode based on the detected average brightness and output a multiplication coefficient;
the color temperature correcting device according to claim 2 that corrects a color temperature of the video signal based on the selected drive mode;
a multiplier operable to multiply set gray scale values of the color-temperature-corrected video signal by the outputted multiplication coefficient to output set gray scale values in which a brightness difference caused by the drive mode is corrected;
a subfield conversing unit operable to set a subfield condition based on the set gray scale values and the set drive mode;
a display panel;
an SSE (scanning, sustaining and erasing) drive circuit that performs control of scanning, sustaining, and erasing of the display panel based on the set subfield condition; and
a data drive circuit of the display panel.

4. A display device, comprising:
an inverse gamma correcting unit operable to perform inverse gamma correction on a gamma-corrected video signal;

the color temperature correcting device according to claim 1 that corrects a color temperature of the inverse-gamma-corrected video signal;

an average brightness detecting unit operable to detect an average brightness of the color-temperature-corrected video signal;

a drive mode selecting unit operable to select a drive mode based on the detected average brightness and output a multiplication coefficient;

a multiplier operable to multiply set gray scale values of the color-temperature-corrected video signal by the outputted multiplication coefficient to output set gray scale values in which a brightness difference caused by the drive mode is corrected;

a subfield converting unit operable to set a subfield condition based on the set gray scale values and the set drive mode;

a display panel;

an SSE (scanning, sustaining and erasing) drive circuit that performs control of scanning, sustaining, and erasing of the display panel based on the set subfield condition; and a data drive circuit of the display panel.

5. A color temperature correcting device that corrects, in a display device that represents brightness of RGB (Red, Green and Blue) of a video signal using a plurality of levels of gray scales, a color temperature of the video signal, the color temperature correcting device comprising:

a multiplier operable to multiply an input gray scale value of a video signal by a drive factor of a selected drive mode and output an input number of light emission pulses;

a storing unit operable to store a number-of-light-emission-pulses conversion table for the input number of light emission pulses to set numbers of light emission pulses for respective RGB that creates white so that a consistent color temperature is maintained;

a number-of-light-emission-pulses converting unit operable to convert the input number of light emission pulses of the video signal to set numbers of light emission pulses for the respective RGB based on the number-of-light-emission-pulses conversion table; and a divider that divides the set numbers of light emission pulses by the drive factor and outputs set gray scale values, wherein the number-of-light-emission-pulses conversion table includes:

a first number-of-light-emission-pulses conversion table indicating a relationship of ideal brightness values for the respective RGB that creates white to the input number of light emission pulses of the video signal to maintain a consistent color temperature; and a second number-of-light-emission-pulses conversion table indicating a relationship to set numbers of light emission pulses at which the ideal brightness values are obtained.

6. A display device, comprising:

an inverse gamma correcting unit operable to perform inverse gamma correction on a gamma-corrected video signal;

an average brightness detecting unit operable to detect average brightness of the inverse-gamma-corrected video signal;

a drive mode selecting unit operable to select a drive mode based on the detected average brightness and outputting a multiplication coefficient;

a multiplier operable to multiply an input gray scale value of the video signal by the outputted multiplication coefficient to output an input gray scale value in which a brightness difference caused by the drive mode is corrected;

the color temperature correcting device according to claim 5 that calculates an input number of light emission pulses by multiplying the input gray scale value by a drive factor of the drive mode, performs color temperature correction by converting the input number of light emission pulses to set numbers of light emission pulses so that a consistent color temperature is maintained, and divides the set numbers of light emission pulses by the drive factor and then outputs set gray scale values;

a subfield converting unit operable to set a subfield condition based on the set gray scale values and the set drive mode;

a display panel;

an SSE (scanning, sustaining and erasing) drive circuit that performs control of scanning, sustaining, and erasing of the display panel, based on the set subfield condition; and a data drive circuit of the display panel.

* * * * *